Sept. 1, 1959    E. C. SCHULTZ    2,902,300
SHIELD FOR ROTATABLE MEMBERS
Filed Oct. 29, 1956

INVENTOR.
Eugene C. Schultz
BY
Richmond S. Hayes
ATTORNEY.

United States Patent Office 2,902,300
Patented Sept. 1, 1959

2,902,300

SHIELD FOR ROTATABLE MEMBERS

Eugene C. Schultz, Jamestown, N.Y., assignor to Marlin-Rockwell Corporation, Jamestown, N.Y., a corporation of Delaware Application October 29, 1956, Serial No. 618,883

4 Claims. (Cl. 286—5)

This invention relates to an improved shield for enclosing either or both ends of bearings or other relatively rotatable concentric members.

In certain types of bearings such, for example, as instrument bearings, it has been found that shields of the type intended to retain lubricant within the bearing and prevent the ingress of foreign matter, when produced from metal with a resilient bead-like securing rim or an all metal shield held in place by a snap ring, have not been entirely satisfactory. With instrument bearings which, of course, are required to be manufactured to precise dimensions, it frequently becomes necessary to disassemble the bearing for examination to determine if any wear has occurred in use, or check the adequacy of the contained lubricant. The beaded shield and the all metal shield held in place by a snap ring, are neither readily insertable nor removable without some possibility of distortion to the outer bearing ring. Furthermore, shields of the type above mentioned may become bent, twisted, or otherwise damaged during the operation of removal, thus necessitating replacement with a new shield which may produce a further out-of-roundness in the outer ring of the bearing. In other words, there are many types of bearings of critical dimensions in which the outer bearing ring may become permanently distorted by the insertion or removal of shields that are held in place by some form of extendable resilient rim, or by a snap ring.

The present invention, intended more particularly for use with precision bearings, has for one of its objects the provision of a shield that will satisfactorily retain lubricant within a bearing and exclude foreign matter therefrom.

Another object of the invention lies in the provision of a shield that, by reason of its design and means of installation, may be held to extremely close tolerances and thus will accurately fit the groove in an outer bearing ring and provide an effective lubricant seal.

Another and important object of the invention lies in the provision of a bearing shield that is held in place by means that is integral therewith.

Still another object of the invention lies in the provision of uniformly distributed prongs integral with the shield ring that engage a groove in the outer bearing ring and, when so engaged, cause the periphery of the shield to have positive sealing contact with said ring.

Other and further objects of the invention will be more fully understood from a consideration of the following specification, taken in conjunction with the accompanying drawing; in which.

Figure 1:
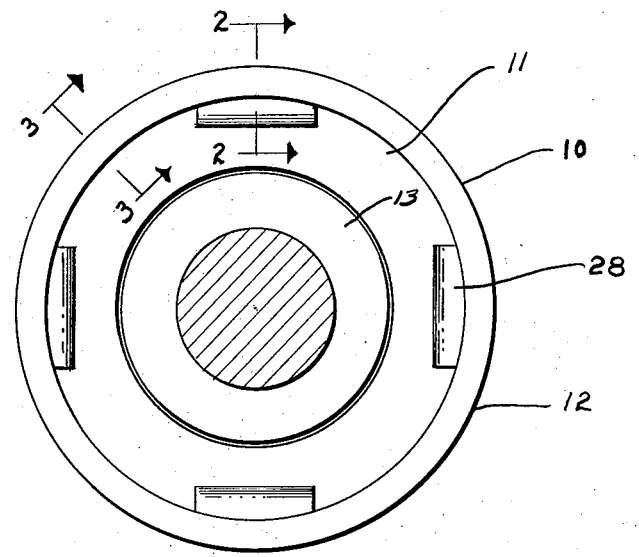
Fig. 1 is a side elevational view of a bearing fitted with a lubricant seal embodying one form of the invention.

Referring more particularly to the drawing, the reference numeral 10 is employed to generally designate a bearing in which a lubricant sealing shield 11, embodying one form of the invention, is mounted. The bearing shown includes an outer ring 12 and an inner ring 13. Suitable balls 14 are adapted to move in the recesses 16 and 17 of the rings. These balls may be held in proper relationship by a retainer, or in any other suitable manner; the arrangement of bearing rings, recesses, or balls, being one or another form of common practise. Although the bearing, as illustrated, shows only one side thereof to be enclosed by the shield 11, it will be understood that, conditions requiring, a shield 11 may be fitted with equal facility to the opposite side of the bearing without modification. The ring 12 has an inner ledge 18 that defines one edge of ball recess 16. This ledge terminates short of the side 19 of the ring 12 in a radially outwardly extending surface 21. From the outer edge of this surface, there continues a generally elliptical lateral groove 22 that is defined at its outer edge by a surface 23. The surface 23 is of the nature of a radial, outward step from the surface 18 and terminates in the side face of the ring 19.

Figures 2, 3:
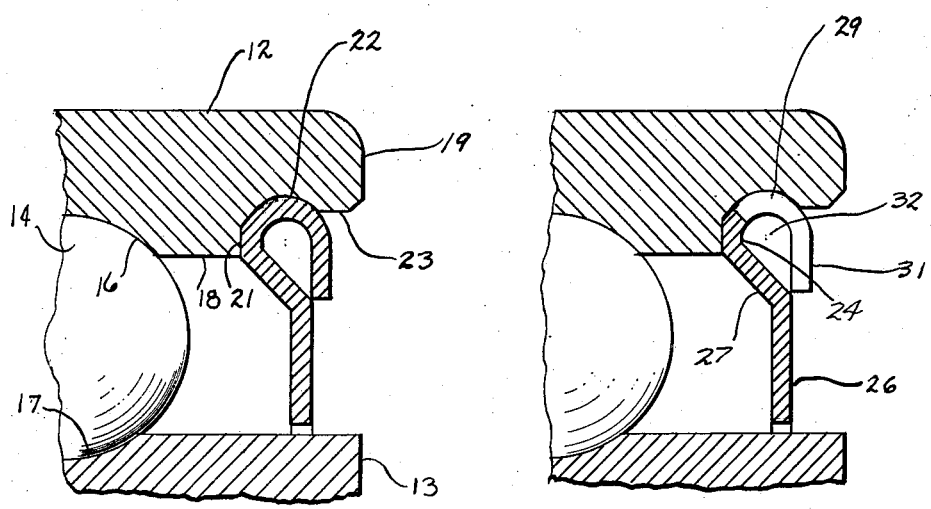
Fig. 2 is an enlarged fragmentary sectional view, taken substantially on the line 2—2 of Fig. 1.
Fig. 3 is a fragmentary sectional view, taken substantially on the line 3—3 of Fig. 1.

One form of the shield 11 consists, as shown in the drawing, of an unbroken, flat, thin, metal ring. The body of the shield, as it appears in cross section in Fig. 3, has a radially directed periphery or rim 24 and a radially, inwardly extending flange 26 integrally connected to the rim 24 by an inclined portion 27; the incline being in an axial direction with respect to the bearing as a whole. At predetermined points on the edge of the rim 24 are a series of lugs 28. As presently shown, there are four of these lugs and they are uniformly located about the shield. It will be understood that if the number of lugs is increased or decreased, they will still be uniformly distributed in keeping with the invention. Each lug is curved laterally away from the body of the shield, as shown at 29, the curvature being somewhat elliptical and conforming to the curvature of the groove 22 of the ring 12. The curved portion 29 terminates in a radially, inwardly extending flange 31. Due to the angularity or lateral offset of the portion 27, as well as the length of the flange 31, the end of this flange abuts the body of the shield at the meeting point of the portion 27 and the flange 26. In this manner the flange 31 is supported against bending, and deflection of the lugs takes place only in the curved portion 29 during installation in a bearing.

When it is desired to install the shield above described, it is positioned against the assembled bearing, the curved portion 29 contacting the marginal edge of the surface 23. A suitable tool simultaneously applies pressure to the flanges 31, thus momentarily changing the contour of the curved portion 29 to an extent to allow them to slip over the surface 23 into the groove 22. When the portions 29 reach the groove 22, they return to their normal contour and fully engage this groove. Of course, in returning to their original shape, they force the rim 24 into pressure contact with the surface 21 of the outer bearing ring, thus creating a lubricant seal as between the shield and the outer ring. It is again mentioned that when the shield is in place, the flanges 31 bear against the body of the shield and tend to prevent any loosening of the pressure contact of the rim 24 with the outer bearing ring at all times. Due to the fact that the lugs 28 are of relatively small proportions and are uniformly distributed about the shield, it has been found that there is no tendency for the outer bearing ring 12 to become out-of-round during installation of the shield. In other words, the lugs are so accurately dimensioned that they will distort only sufficiently to be pressed into the groove 22 without even the slightest expansion of the outer ring at any point, and since the portions 29 normally conform to the curvature of the groove 22, the shield, when assembled with the outer ring, will have no tendency to twist, creep, or otherwise change during running of the bearing.

As has been stated, precision instrument bearings may frequently require examination to determine their condition as to wear and adequacy of lubricant. The present shield is well equipped for such bearings since it may be readily removed without permanent distortion to the shield, or without in any way affecting the shape of the outer bearing ring 12. To remove the shield, it is merely necessary to place a pointed tool in the space 32 at the end of one of the lugs and exert a force through this tool in a radially inward direction. This enables changing the curvature of the portion 29 of the lug to an extent to slip it past the surface 23 of the outer ring. It may be that the relief of one lug is insufficient to enable removal of the shield and, if such is the case, the tool is applied to another lug. It has been found that the removal of shields of this construction, in the manner described, creates no permanent distortion and, consequently, after the interior of the bearing has been examined and lubricant added if necessary, the shield may be again inserted into the bearing by engagement of the lugs with the groove 22.

Although applicant has shown and described only one modification of a shield for bearings or other relatively rotatable concentric members and provided four spring-like lugs for holding the shield in place in one of the bearing rings, it will be understood that the length of the lugs, their number and distribution about the circumference of the shield may be varied without in any way departing from the spirit and scope of the invention as set out in the annexed claims.

Having thus set forth my invention, what I claim as new and for which I desire protection by Letters Patent is:

1. A shield adapted to span the space between a pair of relatively rotatable concentric members, one of said members having a marginally located annular groove radially facing the other of said members, said groove being axially outwardly defined by a surface of predetermined diameter which constitutes the access opening thereto, said shield comprising a disk-like metal ring, a series of lugs integral with and extending radially beyond the periphery of said ring and curved in a lateral direction with respect thereto, the total circumferential length of said lugs not exceeding 50% of the periphery of said ring, said lugs being adapted to extend into and engage the walls of said groove, the peripheral portion of said ring being adapted to engage an annular surface that forms a partial continuation of said groove, the diameter of the peripheral portion of said ring being slightly less than the diameter of the groove access opening in said one member to enable unrestricted passage therethrough, the body of said ring extending radially toward and being in fluid sealing proximity with the other of said members.

2. A shield adapted to span the space between a pair of relatively rotatable concentric members, one of said members having a marginally located annular groove radially facing the other of said members, said shield comprising a disk-like metal ring, a series of lugs integral with and extending radially beyond the periphery of said ring and curved in a lateral direction with respect thereto, the total circumferential length of said lugs not exceeding 50% of the periphery of said ring, said lugs being adapted to extend into and engage the walls of said groove, the peripheral portion of said ring being adapted to have sealing engagement with an annular surface that forms a partial continuation of said groove, the body of said ring extending radially toward and being in fluid sealing proximity with the other of said members.

3. A shield adapted to span the space between a pair of relatively rotatable concentric members, one of said members having a marginally located annular groove radially facing the other of said members, said shield comprising a disk-like metal ring, a series of lugs integral with and extending radially beyond the periphery of said ring and curved in a lateral direction with respect thereto, the total circumferential length of said lugs being at least 20% and not greater than 50% of the periphery of said ring, said lugs being adapted to extend into and engage the walls of said groove, the peripheral portion of said ring being adapted to engage an annular surface that forms a partial continuation of said groove, the body of said ring extending radially toward and being in fluid sealing proximity with the other of said members.

4. A shield in accordance with claim 2 wherein the number and circumferential length of said lugs is only sufficient to enable holding the peripheral portion of said ring in engagement with a portion of the inner wall of said groove under axial pressure adequate to effect a fluid seal therebetween.

References Cited in the file of this patent

UNITED STATES PATENTS

| 1,917,988 | Large | July 11, 1933 |
| 2,355,805 | Koepp | Aug. 15, 1944 |
| 2,766,082 | Ritchey | Oct. 9, 1956 |

FOREIGN PATENTS

| 147,456 | Sweden | Oct. 26, 1954 |